United States Patent
Seo

(10) Patent No.: US 6,463,044 B1
(45) Date of Patent: Oct. 8, 2002

(54) TRAFFIC LOAD CONTROL FOR CDMA MOBILE COMMUNICATION SYSTEM

(75) Inventor: Chang Keun Seo, Inchon-kwangyoksi (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/204,362

(22) Filed: Dec. 4, 1998

(30) Foreign Application Priority Data

May 4, 1998 (KR) ............................................ 98-16027

(51) Int. Cl.$^7$ ............................ H04Q 7/00; H04Q 7/20; H04B 7/216
(52) U.S. Cl. ...................... 370/329; 370/333; 370/441; 455/450; 455/509; 455/513
(58) Field of Search ................................ 370/329, 333, 370/335, 331, 342, 431, 433, 437, 441, 462, 468; 455/418, 422, 450, 453, 452, 507, 509–510, 513, 522, 67.1, 63

(56) References Cited

U.S. PATENT DOCUMENTS

| | | | | | |
|---|---|---|---|---|---|
| 5,857,147 | A | * | 1/1999 | Gardner et al. | 370/468 |
| 6,035,210 | A | * | 3/2000 | Endo et al. | 370/332 |
| 6,070,085 | A | * | 5/2000 | Bender et al. | 455/522 |
| 6,137,784 | A | * | 10/2000 | Wallerius et al. | 370/329 |
| 6,181,917 | B1 | * | 1/2001 | Mansour et al. | 455/63 |
| 6,298,241 | B1 | * | 10/2001 | Hong | 455/522 |

* cited by examiner

Primary Examiner—Wellington Chin
Assistant Examiner—Maikhanh Tran
(74) Attorney, Agent, or Firm—Fleshner & Kim, LLP

(57) ABSTRACT

An apparatus and method for controlling the traffic load of a base station in a mobile communication system. The base station dynamically manages the state transitions of the mobile stations according the amount of traffic load carried by the base station. Also. the base station distinguishes and compensates for the different service requirements of a voice service and a data packet service, thereby providing an efficient and high quality communication service.

20 Claims, 5 Drawing Sheets

TRAFFIC LOAD CONTROL FOR CDMA MOBILE COMMUNICATION SYSTEM

FIELD OF INVENTION

The present invention relates to a mobile communication system and more particularly to an efficient data packet service for a Code Division Multiple Access (CDMA) mobile communication system of the next generation.

DISCUSSION OF THE RELATED ART

A mobile communication system generally includes a plurality of base stations which coordinate a wireless communication among users of mobile stations at various locations. Each base station provides communication service to mobile stations within the base station's coverage area by receiving data packets from a mobile station and directing the data packet to a mobile switching center. Particularly, the data packets are transmitted through a specific frequency bandwidth allocated to one of the base station. The amount of data packets that can be simultaneously transmitted is limited by the frequency bandwidth. Thus, one mobile station has a capacity to provide communication service to a fixed number of mobile stations. Currently, the CDMA mobile communication system lacks a way to control the traffic load of a frequency bandwidth allocated to one mobile station when the amount of communication service requested surpasses the capacity of the mobile station.

In the CDMA mobile communication system of the next generation, the states of the mobile station and the base station/base station controller (BS/BSC) is managed by a predefined Medium Access Control Sub-Layer (MAC). Generally, the mobile station and the BS/BSC may exist in an Active State, a Control State, a Suspended State, or a Dormant State. Under the management of the MAC, the states of the mobile station and BS/BSC are static. Thus, if a large number of mobile stations is receiving data packet service from the same base station, the large number of mobile station exchange data frames with the base station in an activated state of the base station.

Accordingly, a base station which is providing only voice packet service would be in an inactivated state for a very brief period, thereby maintaining a constant load on the communication system. Moreover, the base station must reject new service requests from mobile stations due to a high frame error rate (FER). However, from the standpoint of a mobile station user already receiving a data packet service, the base station would be in a dormant state even though the service has not been completed. Thus, if the user has more data to send, the user would send a new service request reactivating the base station which may overload the communication system depending on the requested service.

FIGS. 1(a) and (b) show the state transition of a BS/BSC and a mobile station during a data packet service in the related art. If a data frame being transmitted in the forward direction from the BS/BSC to a mobile station does not exist for a predetermined time period (Tactive), a message is sent to the mobile station requesting a state transition. The mobile station receives the message and sends a reply message (ACK) after a state transition. Likewise, if a data frame being transmitted in the reverse direction from the mobile station to the BS/BSC does not exist for a predetermined time period Tactive, a message is sent to the BS/BSC requesting a state transition. The BS/BSC receives the message and sends a reply message ACK after a state transition.

In order to make a transition from one state to another, a mobile station or BS/BSC activates a timer with a predetermined time period. When the predetermined time period has elapsed, a message requesting a state transition is sent in the forward and the reverse direction (S1, S3). The transition of states is managed between the MAC of the mobile station and the MAC of the BS/BSC.

Particularly, a mobile station receiving a data packet service remains in the Active State during the time period of sending the data. However, a timer with a predetermined time period has been activated to send a message requesting a state transition to the Control State. Thus, if there are no data transmitted between the mobile station and the BS/BSC for the predetermined time period, a message requesting a state transition is sent in the forward and the reverse directions (S1, S3). Upon receiving the state transition request and after a state transition to the Control State, a reply message ACK is sent back in the reverse and the forward directions (S2, S4).

If a mobile station in the Control State receives a new request for data transmission from a user, the states reverts back to the Active State. However, if there is no request for data service for another predetermined time period of the timer, the state of the mobile station changes to the Suspended State. The state transition is executed in the same manner as before by activating a timer and sending messages requesting a state transition (S1, S3). If the mobile station in the Suspended State determines that there is no more data to be transmitted, the state of the mobile station changes to the Dormant State according to the lapsed time period of the activated timer.

The CDMA mobile communication of the next generation described thus far provides data packet service by managing the state transitions of all the mobile stations receiving the data packet service according to the timer. Using the timer, the logical channels and the physical channels are assigned to and withdrawn from the mobile stations. Accordingly, when the data service request level surpasses the capacity load of a base station, the communication system cannot dynamically manage the mobile stations receiving data packet service.

Generally, the transmission of data packets may be delayed without affecting the quality of the communication service. In contrast, if the transmission of voice packets is delayed, the transmitted message may create long periods of pauses or a stuttering effect at the user side of the mobile station receiving the voice packets, especially for a real-time phone conversation. Despite the different susceptibilities to a delay in transmission time, the mobile communication system in the related art does not distinguish between a voice packet service and a data packet service.

For example, during a period of a heavy traffic load, the mobile communication system does not have a system of an Automatic Repeat Request for a voice packet service. Also, if a base station provides data packet service to mobile stations at a full capacity, the FER of the data packets already being transmitted would more likely increase. Thus, the mobile communication system cannot ensure the quality of the data packet service provided to the mobile stations receiving the service.

Since the transmission of data packets are less susceptible to delays, the quality of the data packet service may be improved through the Radio Link Protocol (RLP) by requesting for a re-transmission of the data frames having an error. However, numerous requests for re-transmission of data frames would further burden the traffic load, especially if the base station is already functioning near full capacity. In such situations, a user at the mobile station may not be able receive the data frames requested by a re-transmission. Furthermore, during an actual packet data service, a Transmission Control Protocol (TCP) frame is transmitted in segments. If one segment of the frame has not been received, the TCP frame as a whole is considered invalid and a request is made for a re-transmission of all the segments of the frame.

Eventually, the number of requests for data packet service will increase resulting in a heavier traffic load for a base station to transmit the data packets. Without an adequate solution to manage the traffic load, a mobile station cannot easily make a transition from one of the inactive states to the Active State. Even if a mobile station successfully makes a transition to the Active State and requests a data packet service, the user of the mobile station is less likely to receive a satisfactory service due to a heavy traffic load. Similarly, a user of a mobile station already receiving voice packet service would less likely receive a satisfactory service due to the increasing traffic load.

OBJECTIVES OF THE INVENTION

Accordingly, an object of the present invention is to solve at least the problems and disadvantages of the related art.

An object of the present invention is to provide mobile communication with a capacity of one base station to serve a greater number of mobile stations.

Another object of the present invention is to provide a mobile communication with a high quality of service for both data and voice packets, even when the traffic load is heavy.

A further object of the present invention is to provide a mobile communication with a dynamic management of the state transitions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWING

The invention will be described in detail with reference to the following drawings in which like reference numerals refer to like elements wherein.

DETAILED DESCRIPTION OF THE INVENTION

Figure 1A:
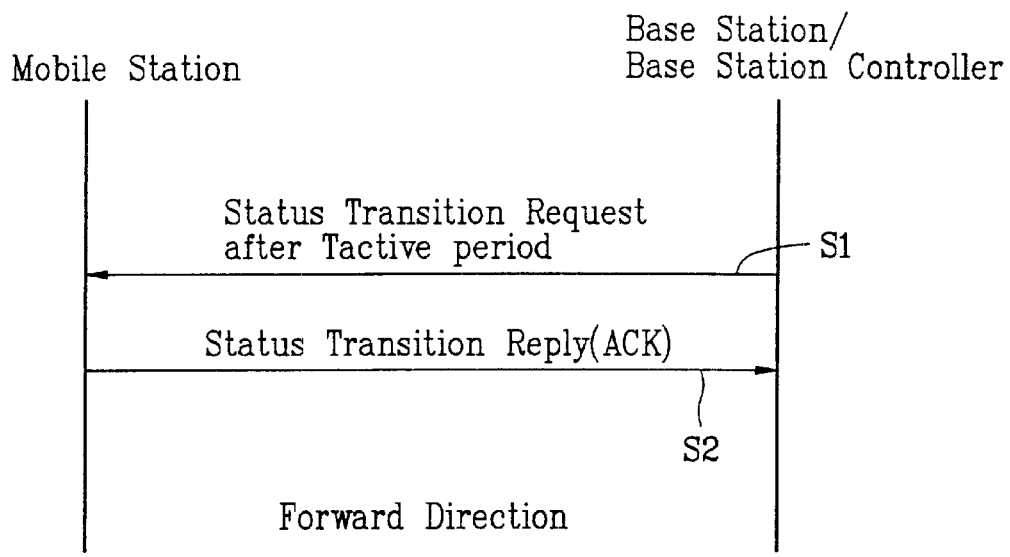
FIGS. 1(a) and (b) show a state transition procedure during a data packet service according to the related art.
Figure 1B:
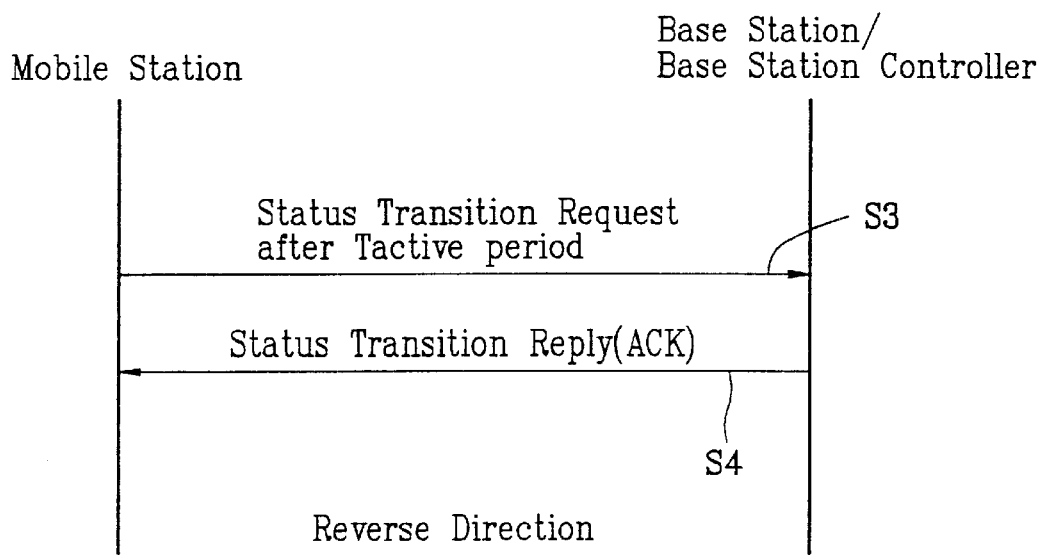
Figure 2:
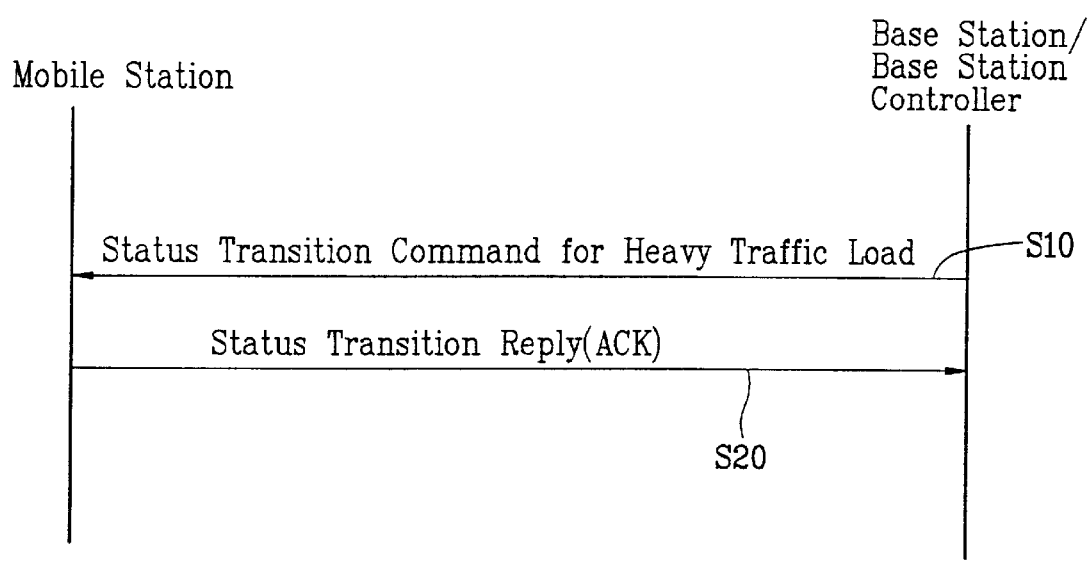
FIG. 2 shows a state transition procedure during a data packet service according to the present invention.

The state transition of a BS/BSC and a mobile station during a data packet service in the preferred embodiment of the present invention is shown in FIG. 2. In the related art, a state transition is managed in a static manner utilizing a timer, regardless of the traffic load of a base station. In contrast, the present invention dynamically controls the state transition depending on the load of the base station.

As discussed above, a base station which supports the data packet service may frequently carry a heavy traffic load and without taking steps to alleviate such situations, the traffic load would continue to increase causing a deterioration of the service quality. For example, the transmission FER for all the users of the mobile station receiving service cannot be maintained to ensure the service quality. Thus, in the preferred embodiment of the present invention, mobile stations are forcibly inactivated according to a ranking based on the FER of a mobile station, the number of re-transmission requested by a mobile station, and the size of the transmission data stored in the base station buffer.

Figure 3:
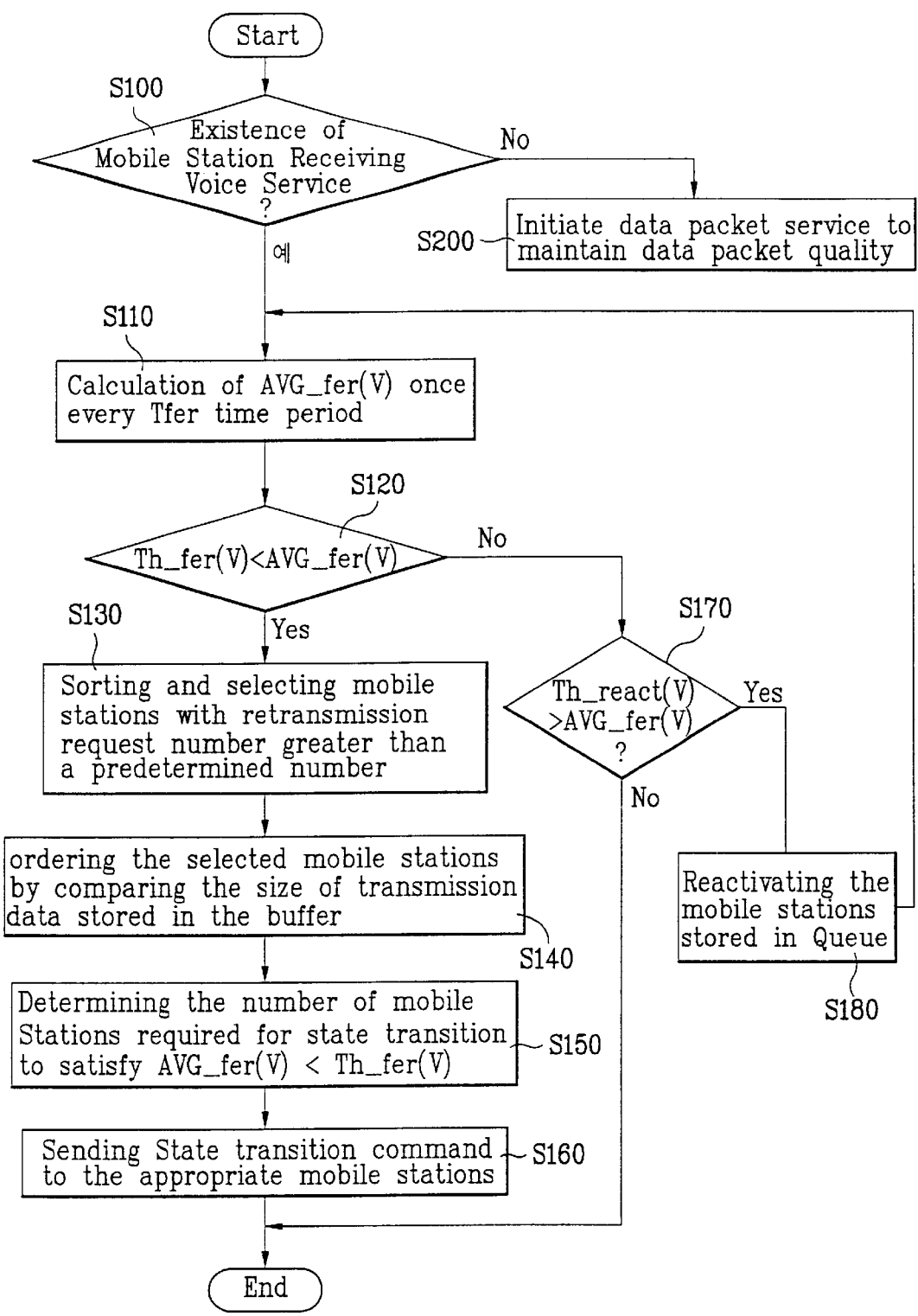
FIG. 3 is a flowchart showing a preferred embodiment of the data packet service to maintain the voice packet service quality.
Figure 4:
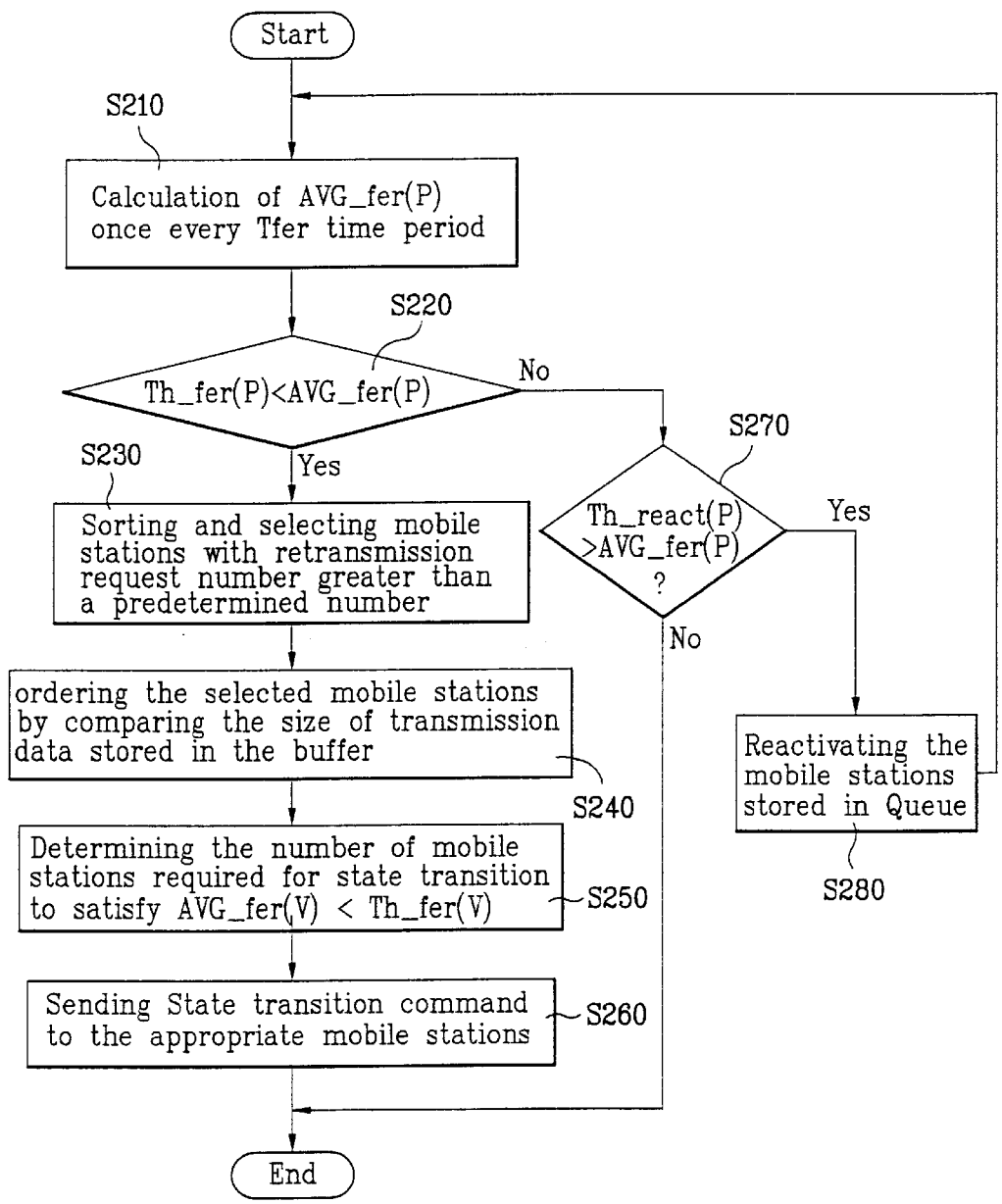
FIG. 4 is a flowchart showing a preferred embodiment of the data packet service to maintain the data packet service quality.

Referring back to FIG. 2, a base station in an overloaded status sends a message to a mobile station commanding a state transition (S10). After receiving the message, the mobile station simultaneously makes a state transition and sends a reply message (ACK) to the base station (S20). The mobile station makes a transition from the Active State to the Control State. FIG. 3 is a flowchart showing a preferred embodiment of the data packet service to maintain the voice packet service quality. FIG. 4 is a flowchart showing a preferred embodiment of the data packet service to maintain the data packet service quality.

Referring to FIG. 3, the base station first determines whether a voice packet service is being provided to a mobile station within the sectors of its coverage area (S100). If a mobile station receiving voice packet service exists, an Average Frame Error Rate (AVG_fer(V)) of the mobile stations receiving voice service is measured once every Tfer time period for each sector (S110). Within each sector, the measured AVG_fer(V) of the mobile stations receiving voice service is compared to a predetermined Threshold Frame Error Rate (Th_fer(V)) which is the maximum level of FER to support the mobile stations receiving voice service in the Active State.

If the AVG_fer(V) is greater than the Th_fer(v), the base station begins to sort the mobile stations not receiving voice service, i.e. mobile stations receiving data packet service, based upon whether the number of re-transmission requests within the Tfer time period surpasses a predetermined threshold number (S120). The mobile stations with the number of re-transmission requests greater than the predetermined threshold number are selected (S130). Next, an ordering of the selected mobile stations is determined based upon the size of the transmission data stored in the base station buffer (S140). The mobile stations are ordered from the mobile station with the smallest to the largest transmission data and then stored in the buffer Queue, used also for storing the transmission data in case of an emergency.

After the sorting and ordering of the mobile stations, the number of mobile stations for a state transition from an Active State to an inactive state is determined, the number satisfying the level of AVG_fer(V) to be lower than the level of Th_fer(V) for an efficient and high quality communication service (S150). Thus, a message commanding a state transition is sent to an appropriate number of mobile stations receiving data service in the order determined in step S140. As a result, the data transmission to the mobile stations forced to make a state transition is impeded for a fixed duration.

However, if the Th-fer(V) was determined to be greater than the AVG-fer(V) in step S120, a Reactivated Threshold Frame Error Rate (Th_react(V)) of the mobile stations which must be activated, i.e. the mobile stations forced to make a transition and new mobile stations entering the cell boundary, is calculated and is compared to the AVG_fer(V) (S170). If the Th_react(V) is determined to be greater than the AVG_fer(V), the mobile stations stored in the Queue are first reactivated in the order determined in step S140 (S180). Moreover, if a mobile station goes is in the Dormant State, the MAC of the communication system deletes all information corresponding the mobile station at the RLP level. Accordingly, a mobile station forced to make a transition to an inactive state must not advance to the Dormant State. Thus, forcibly inactivated mobile stations are barred from making a transition to the Dormant State.

If the base station determines that there are no mobile stations receiving voice service in step S200, a data packet service for maintaining the data service is initiated. Referring to FIG. 4, first an Average Frame Error Rate (AVG_fer(P)) of the mobile stations receiving data packet service within each sector is measured once every Tfer time period for each sector (S210). Within each sector, the measured AVG_fer(P) of the mobile stations receiving data packet is compared to a predetermined Threshold Frame Error Rate (Th_fer(P)) which is the maximum level of FER to support the mobile stations receiving data service in the Active State.

If the AVG_fer(P) is greater than the Th_fer(P), the base station begins to sort the mobile stations receiving data packet service in the Active State based upon whether the number of re-transmission requests within the Tfer time period surpasses a predetermined threshold number (S220). The mobile stations with the number of re-transmission requests greater than the predetermined threshold number are selected (S230). Next, an ordering of the selected mobile stations is determined based upon the size of the transmission data stored in the base station buffer (S240). The mobile stations are ordered from the mobile station with the smallest to the largest transmission data and then stored in the buffer Queue, used also for storing the transmission data in case of an emergency.

After the sorting and ordering of the mobile stations, the number of mobile stations for a state transition from an Active State to an inactive state is determined, the number satisfying the level of AVG_fer(P) to be lower than the level of Th_fer(P) for an efficient and high quality communication service (S250). Thus, a message commanding a state transition is sent to an appropriate number of mobile stations receiving data service in the order determined in step S240. As a result, the data transmission to the mobile stations forced to make a state transition is impeded for a fixed duration.

However, if the Th-fer(P) was determined to be greater than the AVG-fer(P) in step S220, a Reactivated Threshold Frame Error Rate (Th_react(P)) of the mobile stations which must be activated, i.e. the mobile stations forced to make a transition and new mobile stations entering the cell boundary, is calculated and is compared to the AVG_fer(P) (S270). If the Th_react(P) is determined to be greater than the AVG_fer(P), the mobile stations stored in the Queue are first reactivated in the order determined in step S240 (S280). Moreover, if a mobile station goes is in the Dormant State, the MAC of the communication system deletes all information corresponding the mobile station at the RLP level. Accordingly, a mobile station forced to make a transition to an inactive state must not advance to the Dormant State. Thus, forcibly inactivated mobile stations are barred from making a transition to the Dormant State.

Furthermore, as a result of forcibly inactivating mobile stations, the transmission of data from the base station to the mobile station is blocked for the time of inactivity. The interrupted data are stored in the Queue in the order of the size of transmission data according to the International Mobile Station Identity (IMSI). Although the Queue is stationary and remains with the base station, a mobile station with transmission data stored in the Queue may move out of the base station coverage area. Consequently, the base station also maintains a Virtual Traffic Channel by which the base station is notified whether a mobile station with transmission data still stored in the Queue has moved out of the cell boundary. If such a mobile station does leave the cell boundary, the transmission data is stored in the Queue of the new base station by the base station controller according to the appropriate IMSI.

Figure 5:
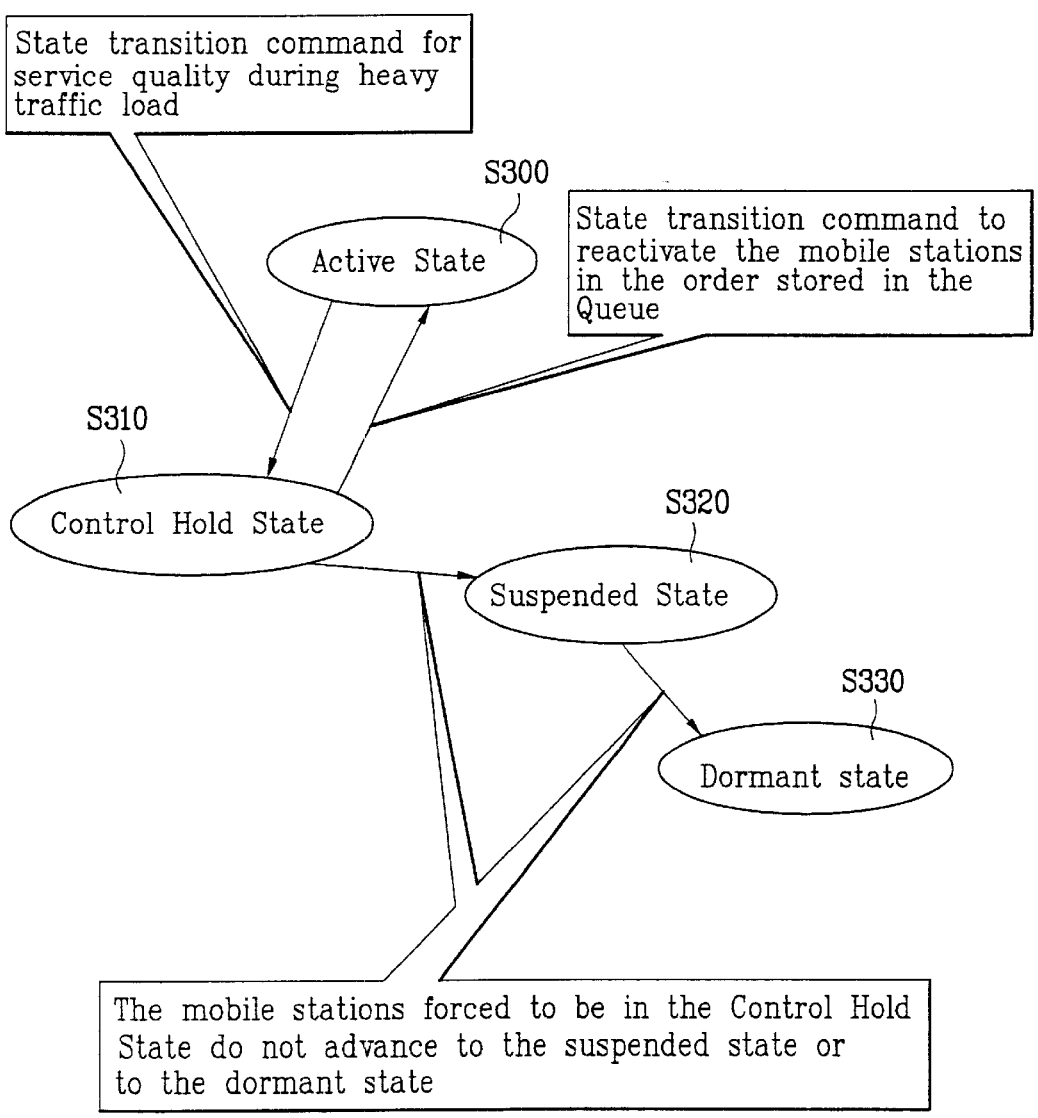
FIG. 5 shows the transition states allowing a high quality communication service according to the present invention.

FIG. 5 shows the transition states allowing a high quality communication service according to the present invention. During a overloaded status of a base station, a timer was simply used in the related art to manage the state transitions. In contrast, the present invention the state transitions are dynamically managed by forcing a state transition depending on the situation of the traffic load. If the traffic load is heavy, the BS/BSC sends a state transition command to a mobile station and the mobile station makes a transition from the Active State (S300) to the Control Hold State (S310).

Also, unlike the mobile stations of the related art which have made a state transition, the forcibly inactivated mobile stations of the present invention not only made a state transition, but still have data to be transmitted. Thus, the forcibly inactivated mobile stations do not advance to the Suspended and Dormant States (S320, S330) by the timer. Furthermore, the mobile stations forced into the Control State (S310) are reactivated to the Active State (S300) in the order stored in the Queue depending on the traffic load by a state transition command.

As described above, the preferred embodiment of the communication service according to the present invention recognizes and compensates for the differences of a voice service and data packet service. Particularly, because the voice service needs to be transmitted in real time and cannot have a RLP level, the transmission FER of the voice service must be lower than the data packet service. On the other hand, because the data packet service has a RLP level, the defective frames caused during the transmission may be restored without affecting the quality of the communication service. Although the transmission FER for the data packet service must still be minimized and some level of transmission FER is allowed for the voice service, the Th_fer(P) may generally have a greater value than the Th_fer(V).

For an effective and high quality communication service, the voice frames of the voice service should be transmitted in real time while the data packet frames of the data service may be delayed during heavy traffic load. The base station may also force the mobile stations in the Dormant State to make a state transition for a communication service. Thus, a base station may provide service to a greater number of mobile stations, including new mobile stations entering the cell boundary.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling the traffic load of a base station in a mobile communication service system comprising the steps of:

(a) determining whether any mobile station within each sector of the cell boundary is receiving voice service;

(b) controlling the traffic load using a first predetermined threshold frame error rate if a mobile station is receiving voice service as determined in step (a); and (c) controlling the traffic load using a second predetermined threshold frame error rate if there are no mobile stations receiving voice service as determined in step (a).

2. A method of claim 1, wherein the second predetermined threshold frame error rate is greater than the first predetermined threshold frame error rate.

3. A method of claim 1, wherein the step of (b) further comprises the steps of:

periodically calculating an average frame error rate of the mobile stations receiving voice service within each sector, every Tfer time period;

comparing the average frame error rate to the first predetermined threshold frame error rate;

ranking the mobile stations receiving data service for state transition if the average frame error rate is greater than the first predetermined threshold frame error rate; and sending a first state transition command to at least one mobile station receiving data service using the result of the ranking.

4. A method of claim 3, wherein the step of ranking further comprises the steps of:

sorting the mobile stations receiving data packet service based upon whether the number of re-transmission requests within the Tfer time period surpasses a first predetermined number;

selecting the mobile stations with the number of re-transmission requests greater than the first predetermined number; and ordering of the selected mobile stations based upon the size of the transmission data.

5. A method of claim 4, wherein in the ordering step, the mobile stations are ordered from the mobile station with the smallest to the largest transmission data.

6. A method of claim 4, wherein the step of sending a command further comprises the steps of:

determining the required number of mobile stations for state transition in order to lower the average frame error rate below the first predetermined threshold frame error rate;

sending a state transition command according to the ordering of the selected mobile stations.

7. A method of claim 3, further comprising the steps of:

calculating a reactivated threshold frame error rate of the mobile stations which must be activated if the average frame error rate is less than the first predetermined threshold value;

comparing the average frame error rate to the reactivated threshold frame error rate;

ranking the mobile stations which must be activated if the average frame error rate is greater than the reactivated threshold frame error rate; and sending to at least one mobile station a second state transition command to activate said at least one mobile station according to the results of the ranking.

8. A method of claim 3, further comprising the step of:

storing the transmission data corresponding to the mobile stations receiving data service for state transition.

9. A method of claim 3, further comprising the steps of:

sending a reply message to the base station from the mobile station receiving a state transition command after a state transition; and preventing the mobile stations which made a state transition by a state transition command from advancing to at least the Dormant State.

10. A method of claim 1, wherein the step of (c) further comprises the steps of:

periodically calculating an average frame error rate of the mobile stations receiving data service within each sector, every Tfer time period;

comparing the average frame error rate to the second predetermined threshold frame error rate;

ranking the mobile stations receiving data service for state transition if the average frame error rate is greater than the second predetermined threshold frame error rate; and sending a first state transition command to at least one mobile station receiving data service using the result of the ranking.

11. A method of claim 10, wherein the step of ranking further comprises the steps of:

sorting the mobile stations receiving data packet service based upon whether the number of re-transmission requests within the Tfer time period surpasses a second predetermined threshold number;

selecting the mobile stations with the number of re-transmission requests greater than the second predetermined threshold number; and ordering of the selected mobile stations based upon the size of the transmission data stored in a base station buffer.

12. A method of claim 11, wherein in the ordering step, the mobile stations are ordered from the mobile station with the smallest to the largest transmission data.

13. A method of claim 10, wherein the step of sending a command further comprises the steps of:

determining the required number of mobile stations for state transition in order to lower the average frame error rate below the second predetermined threshold frame error rate;

sending a second state transition command according to the ordering of the selected mobile stations.

14. A method of claim 7, further comprising the steps of:

calculating a reactivated threshold frame error rate of the mobile stations which must be activated if the average frame error rate is less than the second predetermined threshold value;

comparing the average frame error rate to the reactivated threshold frame error rate;

ranking the mobile stations which must be activated if the average frame error rate is greater than the reactivated threshold frame error rate; and sending to at least one mobile station a state transition command to activate said at least one mobile station according to the results of the ranking.

15. A method of claim 10, further comprising the step of:

storing the transmission data corresponding to the mobile stations receiving data service for state transition.

16. A method of claim 10, further comprising the steps of:

sending a reply message to the base station from the mobile station receiving a state transition command after a state transition; and preventing the mobile stations which made a state transition by a state transition command from advancing to at least the Dormant State.

17. A mobile communication system comprising:

at least one mobile station receiving either voice service or data packet service;

a base station providing the voice service and the data packet service by controlling the traffic load using one of a first predetermined threshold frame error rate or a second predetermined threshold frame error rate, depending on whether at least one mobile station is receiving voice service.

18. A system of claim 17, wherein the base station sends a first state change command to at least one mobile station receiving data service during a heavy traffic load and wherein said at least one mobile station receiving the first state change command makes a transition to an inactive state.

19. A system of claim 18, further comprising a buffer storing the transmission data corresponding to said at least one mobile station making a transition to an inactive state according to the first state change command.

20. A system of claim 19, wherein the base station sends a second state change command to at least one mobile station having made a state transition according to the first state change command when the traffic load is not heavy, and wherein said at least one mobile station having made a state transition according to the first state change makes a transition to an active state.

* * * * *